(12) United States Patent
Stimpson (10) Patent No.: US 7,241,956 B1
(45) Date of Patent: Jul. 10, 2007

(54) WEIGHT MEASUREMENT SYSTEM FOR STEEL MILL TRANSFER CARS

(76) Inventor: Jon L. Stimpson, 108 Ivy Ridge Rd., Madison, AL (US) 35757

( * ) Notice: Subject to any disclaimer, the term of this patent is extended or adjusted under 35 U.S.C. 154(b) by 73 days.

(21) Appl. No.: 10/962,783

(22) Filed: Oct. 12, 2004

(51) Int. Cl.
*G01G 19/08* (2006.01)
*G01G 21/02* (2006.01)

(52) U.S. Cl. .............. 177/136; 177/229; 177/DIG. 9; 73/862.623

(58) Field of Classification Search ........ 177/136–139, 177/DIG. 9, 211, 229; 73/862.632–862.639
See application file for complete search history.

(56) References Cited

U.S. PATENT DOCUMENTS

| | | | | |
|---|---|---|---|---|
| 3,858,672 A | * | 1/1975 | Mrozek et al. | 177/136 |
| 4,020,911 A | * | 5/1977 | English et al. | 177/136 |
| 4,095,659 A | * | 6/1978 | Blench et al. | 177/136 |
| 4,411,325 A | * | 10/1983 | Hamilton | 177/136 |
| 4,516,646 A | * | 5/1985 | Bergfalk | 177/211 |
| 4,666,003 A | * | 5/1987 | Reichow | 177/136 |
| 4,744,254 A | * | 5/1988 | Barten | 73/862.622 |
| 4,878,551 A | * | 11/1989 | Watkins et al. | 177/139 |
| 5,419,210 A | * | 5/1995 | Haker | 73/862.631 |
| 6,495,774 B1 | * | 12/2002 | Pederson | 177/136 |
| 7,009,118 B2 | * | 3/2006 | Pottebaum et al. | 177/136 |

* cited by examiner

*Primary Examiner*—Randy W. Gibson
(74) *Attorney, Agent, or Firm*—Mark Clodfelter (57) ABSTRACT

A weighing system for a ladle transfer car is disclosed. For each wheel of the transfer car, a heat-resistant load cell designed to tolerate temperatures of at least 550 degrees Fahrenheit is mounted in axle block housings on each side of each wheel. Each load cell features a three-point mounting system on a top side and a bisected load application pad on a lower side. A load-concentration member bears against the load application pad. Each load cell and each load concentration member is constructed to be fitted into a relatively protected region between a top of an axle block and a top of an axle block housing within the structure of a transfer car.

12 Claims, 7 Drawing Sheets

WEIGHT MEASUREMENT SYSTEM FOR STEEL MILL TRANSFER CARS

FIELD OF THE INVENTION

The present invention relates generally to the field of weighing heavy masses on mobile platforms under high temperature conditions, and more particularly, to weighing ladles of molten metal loaded onto ladle transfer cars as used in steel mills or other metal processing facilities.

BACKGROUND OF THE INVENTION

Increasing demands for improved quality control and efficiency in production of steel and other metals requires that weight of input components and products be accurately measured at various steps in production of steel or other metal products. Although input metals and compounds for a melt (also called a heat) are typically weighed before or during placement directly into a furnace, or into a ladle used for melting steel or other metals in a furnace, burn-off or out-gassing of materials contained in a melt, or removal of slag, during melting and mixing, can change weight of a melt or heat during processing. This alteration of components of the melt may in turn adversely affect properties or quality of the finished metal. Thus, it is important to be able to obtain an accurate weight of a ladle of molten metal after removal from a furnace and before additional processing of the metal.

In many cases, after processing in a furnace, a ladle of molten metal is removed from the furnace by a crane and placed on a transfer car to be moved to a separate portion of a steel mill or other metal processing facility for additional processing. A transfer car is a generally self-propelled vehicle that rides on steel wheels on rails somewhat like a railroad car. A transfer car may have a simple flat platform somewhat like a flatbed rail car, onto which a ladle of molten metal or components for a melt may be placed, or a transfer car may contain a structure somewhat like that of a short steel bridge with receptacles that accept support members extending near a top of a ladle and suspends a ladle for transport. Ladles may be placed upon or removed from transfer cars by overhead cranes or other equipment capable of handling the weight of a ladle of molten metal. A full ladle of molten steel may weigh as much as 500,000 pounds or more, whereas an empty ladle may weigh approximately 150,000 pounds.

Temperatures of components on a transfer car located near a ladle of molten steel can easily exceed 600 degrees Fahrenheit. Past practice has been to attempt to measure weight of a ladle of molten steel based on deformation of structure of a transfer car as indicated by relative movement of cantilevered rods connected to different points on structural members of the transfer car or as measured by strain gages attached directly to these structural members. Other practices make use of load cell pins located at structural joints that directly support weight of a ladle or that support weight of a transfer car platform and a ladle. However, cantilevered rods, load cell pins, and other elements of existing measurement systems, as well as movable joints between supported elements and underlying support structures, are exposed to falling debris or even splashed with molten metal, and are also exposed to severe temperature and shock and vibration environments, with a result that existing methods and apparatus for measuring weight of ladles of molten metal require frequent recalibration and have proven generally unreliable and costly to use.

It is thus one object of the instant invention to provide more durable load cells and associated structural and electrical elements that may be mounted in a relatively protected location on a transfer car. It is another object of the invention to provide a load cell that can provide more accurate and reliable indications of weight changes associated with placement of ladles on a transfer car than hithertofore possible. It is yet another object of the invention to provide a load cell requiring less maintenance and cleaning of transfer car or other vehicle structure. It is yet another object of the invention to provide a load cell and weighing system requiring less frequent calibration to maintain accurate weight measurement capabilities. It is a further object of the instant invention to provide a heat-resistant load cell to permit reliable operation at temperatures of 550 degrees Fahrenheit or more associated with proximity to a ladle of molten metal. Other objects of the invention will become apparent upon a reading of the following specification.

DETAILED DESCRIPTION OF THE DRAWINGS

Figure 1:
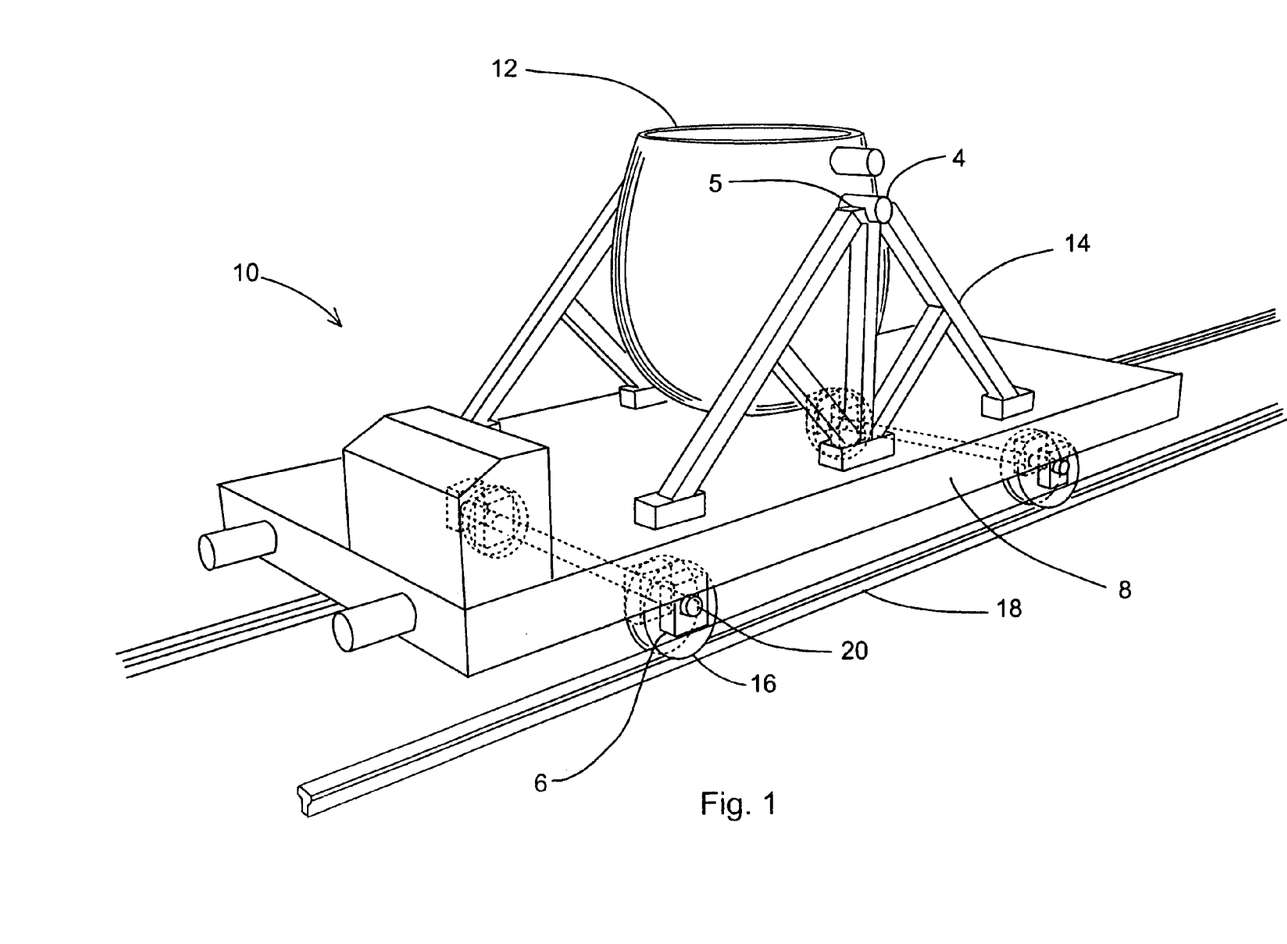
FIG. 1 is a representative illustration of a ladle transfer car as is used in some steel mills or other metal processing facilities.

FIG. 1 illustrates an example of a transfer car 10 with a support structure and receptacles 5 that accept and support large support extensions or stubs 4 integrated into a structure of a ladle 12 that may be used to transport components of a melt or to contain and transport molten metal. A transfer car may be designed to support one, or more than one, ladle. A transfer car typically uses steel wheels 16 that ride on steel tracks 18 to transport one or more ladles 12 between locations in a steel mill or other metal processing facility. A transfer car may include an engine or other means of self-propulsion or may be pushed or towed using bumpers or couplings similar to those used with standard railroad cars. An examination of typical structure of a transfer car 10, as illustrated in FIG. 1, reveals that multiple axle bars 20 extend generally horizontally beneath most structure of a transfer car and connect to steel wheels 16 generally located on either side of a transfer car 10. Weight forces of a transfer car are transferred through axles 20 and wheels 16 to rails 18. As illustrated here and also in FIG. 2, axle block housings 6 may be designed into structure of a transfer car 10 to accept axle blocks 24 that provide an interface between a structural frame 8 of a transfer car and axles 20 and wheels 16 of a transfer car.

Figure 2:
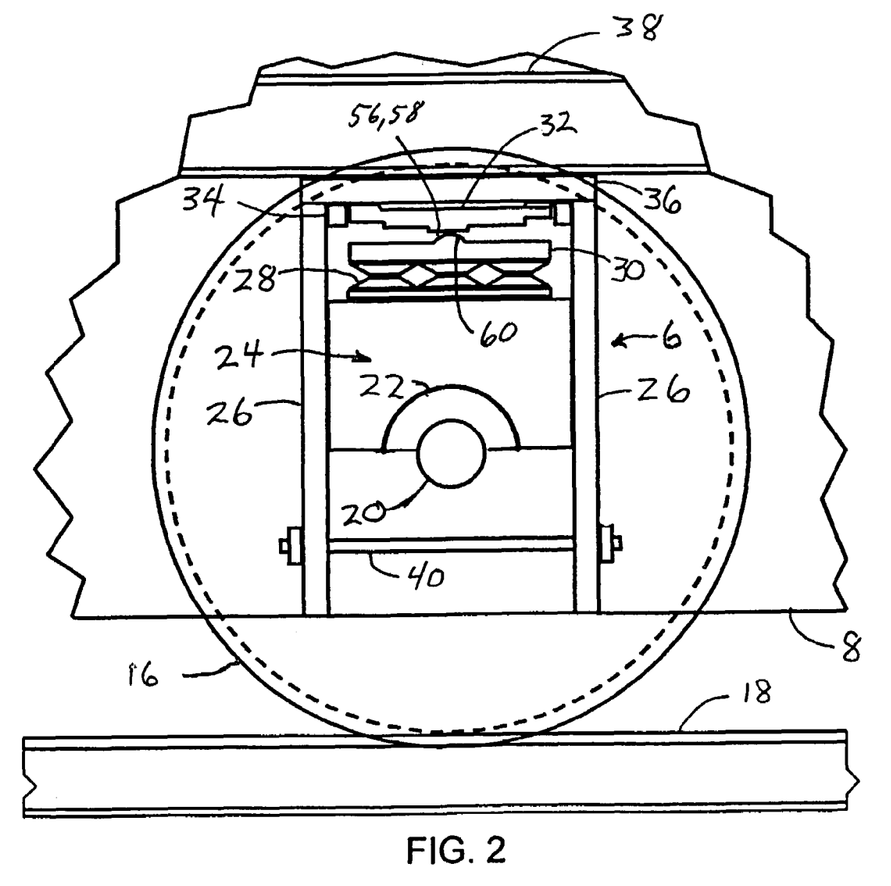
FIG. 2 is an illustration showing how a load cell of the instant invention may be used in an axle block housing such as is used in some transfer cars.

Refer now to FIG. 2, which presents a side-on view of an axle block housing 6 and wheel 16. To support substantial weight of a transfer car loaded with a full ladle of molten metal, axles 20 typically turn in bushings 22 in semi-cylindrical channels in axle blocks 24, typically made of steel, which are positioned within vertical sides of an axle block housing 6 formed within a structure of a transfer car, typically near corners of a transfer car or in such locations where weight is concentrated by a support structure 14 (FIG. 1) or frame 8 of a transfer car. Dual axle block housings 6 (FIG. 2) may be positioned adjacent to and on both sides of each wheel 16, so that a four wheel transfer car has eight axle block housings, as is common, or single axle block housings may be positioned to outer sides or inner sides of each wheel 16, depending upon weight of loads to be carried. For very heavy loads, additional wheels, axles, axle blocks, and axle block housings may be used to spread and support weight of a transfer car. To help absorb shocks that may be associated with crane placement of a filled ladle onto a transfer car, one or more sections of springs, cushions, or other shock absorbing elements 28, which may also include large spring washers or pads made of high-temperature silicon rubber or other material capable of withstanding temperatures up to 550 degrees Fahrenheit, may be positioned in a space between a top of axle block 24 and load bearing structural member 38 across top 36 of a vertical channel created between sides 26 of axle block housing 6 which surrounds axle block 24. Typically, lubricated inner surfaces of sides 26 of axle block housing 6 are free to slide up and down with respect to sides of axle block 24, but horizontal movement between axle block 24 and sides of axle block housing 6 is constrained by close tolerances in horizontal dimensions of axle block 26 and horizontal dimensions between sides 26 of axle block housing 6. Vertical dimension of axle block 24 is sufficiently long to prevent tilting and binding of axle block 24 within a channel formed by sides 26 of axle block housing 6.

Total weight of a transfer car and ladle is transferred to axles 20 and wheels 16 through a plurality of such axle blocks 24. A region immediately above axle blocks 24 and within each axle block housing 6 is protected from splatters of molten metal and other falling debris, as by covers (not shown) that cover and protect structural members within the channel formed by side members 26. Consequently, total weight of a suspended portion of a transfer car, including a loaded or empty ladle, may be measured by placing a load cell 32 within each space between a top of an axle block 24 and below each top plate 36 of each axle block housing 6. As each axle block housing 6 slides vertically around each axle block 24 in response to changes in total weight of supported portions of the transfer car and ladle, total weight loads of the transfer car and ladle are transmitted through load cells 32, creating a change in electrical output of sensors integrated in load cells 32.

Figure 3:
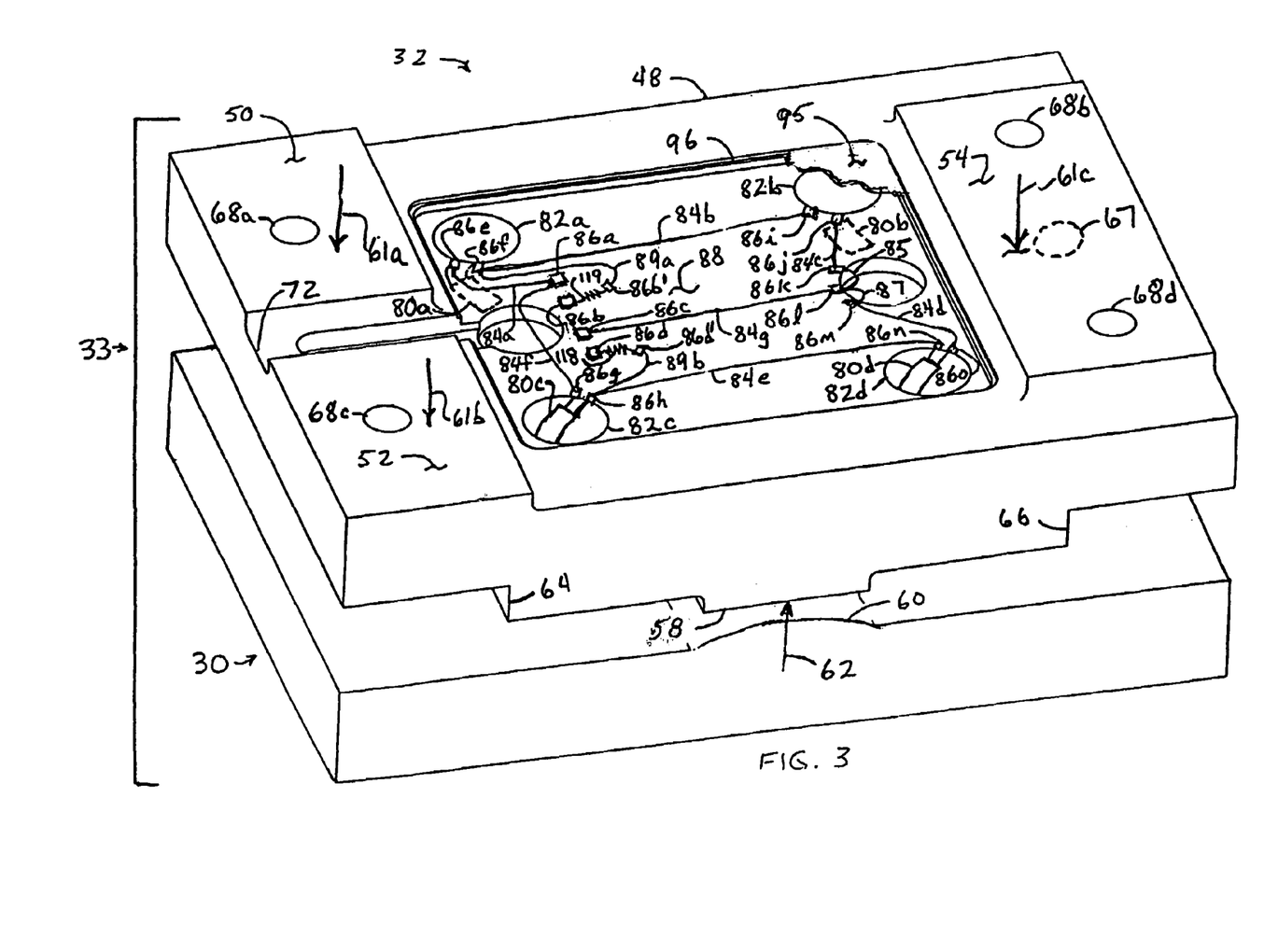
FIG. 3 is an illustration taken from above and slightly to one side of a load cell assembly of the instant invention.

One example of a load cell of the instant invention is illustrated in a view from above in FIGS. 3 and 3a and in a view from below in FIG. 4. Several features are incorporated into design and fabrication of load cells 32 of the instant invention in order to provide required accuracy and reliable performance within a high temperature and shock environment of a transfer car, and within a limited space available within an axle block housing 6 of a transfer car or similar conveyance vehicle. First, since only a limited vertical space is available for integration of a load cell 32 within an axle block housing 6 or similar structure of a transfer car, load cells 32 of the instant invention are designed as generally rectangular plates or blocks 48 having, in this example, a length of approximately 10.75 inches, a width of approximately 7.75 inches, and an original thickness of approximately 2 inches before being machined to a form as illustrated with support pads 50, 52, 54, load application pads 56, 58, and clearance notches 64, 66. For an example application as described herein, a material that may be used for fabrication of load cell structure is 17-4 stainless steel heat treated to Rockwell 42 to 45 on a C-scale, having a tensile strength of 160,000 psi. When such a material is used in a design as described and illustrated herein, it is capable of providing a load cell with a capacity range of up to 150,000 pounds. Bolt holes 68a through 68d are provided with countersunk holes 70a through 70d (FIG. 4) so that load cell 32 may be bolted into place with support pads 50, 52, 54 contacting a top plate 36 FIG. 2) of an axle block housing 6. Bolt heads are recessed within countersunk holes 70a through 70d (FIG. 4) to insure clearance provided by notches 64, 66 (FIG. 3) is maintained. Clearance notches 64, 66 are features provided to accommodate distortion and misalignment of top plate 36 (FIG. 2) and upper region of axle block housing 6 as may occur in a severe environment of a transfer car. Another innovative feature in a load cell 32 of the instant invention, provided to accommodate misalignments that may occur in a severe operating environment of a transfer car, is use of a single support pad 54 (FIG. 3) on one end, and separate support pads 50 and 52 on an opposite end, separated by a notch 72 formed in load cell 32. Although four bolts may be used to attach load cell 32 into position within a transfer car, shape, location, and extent of support pads 50, 52, 54 permits load cell 32 to respond to weight loads as a structure supported at three points rather than four. Since only three points are needed to define a plane, use of only three support pads, rather than four support points as may be used in a more conventional mounting, promotes a more nearly linear stress-strain response within load cell 32 as increasing weight loads are applied between load application pads 56, 58 (FIG. 4) and support pads 50, 52, 54 (FIG. 3). Pre-straining a load cell 32 to force a four point mounting on an uneven surface, as may be likely in a transfer car, rather than the three point mounting provided by the innovative design of the instant invention, may cause a non-linear response of load cell strain gages as increasing weight loads are applied. The difference and benefit of a three-point mount of the instant invention may be understood in analogy to use of a three-legged stool on an uneven floor, where a four-legged stool would rock between unevenly supported legs, leading to non-linear response to loading as legs deform and the fourth leg contacts the floor and accepts a portion of a weight load. In alternate embodiments, a single mounting bolt hole 67 (dashed lines) may be used in some instances to further implementation of a three point mounting arrangement. In addition, a load cell with three support pads eliminates a need for shims to be used due to uneven surfaces of an underneath side of a transfer car, thus conserving installation time of load cells of the instant invention Separation of load application pads 56, 58 by notch 74 further implementation of a three point mounting arrangement. In addition, a load cell with three support pads eliminates a need for shims to be used due to uneven surfaces of an underneath side of a transfer car, thus conserving installation time of load cells of the instant invention.

Separation of load application pads 56, 58 by notch 74 further promotes a linear response of load cell 32 when mounted on a uneven surface as may be likely in the instance of a transfer car. When load cell 32 is installed in a position as illustrated in FIG. 2, load application pads 56, 58 are on a bottom side of a load cell and contact a ridge 60 on a load concentration plate 30 that spans any shock absorbing element 28 such as cushions or springs that may be used between a supported portion of a transfer car and axle blocks 24. Use of a load concentration plate 30 helps insure reaction forces to weight loads are concentrated and applied only through load application pads 56, 58 (FIG. 4) as intended so that shear regions 51, 53 of load cell 32 located between load application pads 56, 58 and support pads 54, 50, 52, are subjected to linearly increasing shear forces when an increasing composite weight load force 61a, 61b, 61c (FIG. 3) of a supported portion of a transfer car, reacts with a reactive support force 62 applied through ridge 60 to load application pads 56, 58 (FIG. 4). In some embodiments, load cell 32 and load concentration plate 30 act together as a load cell assembly 33, as indicated in FIG. 3 and FIG. 4. In other embodiments, load application pads 56, 58 could be rounded off so as to create a ridge to interact against a flat surface, which may be a load distribution plate, if cushions are used, or a top of an axle block 24, or, in different embodiments, another structural member.

Figure 3A:
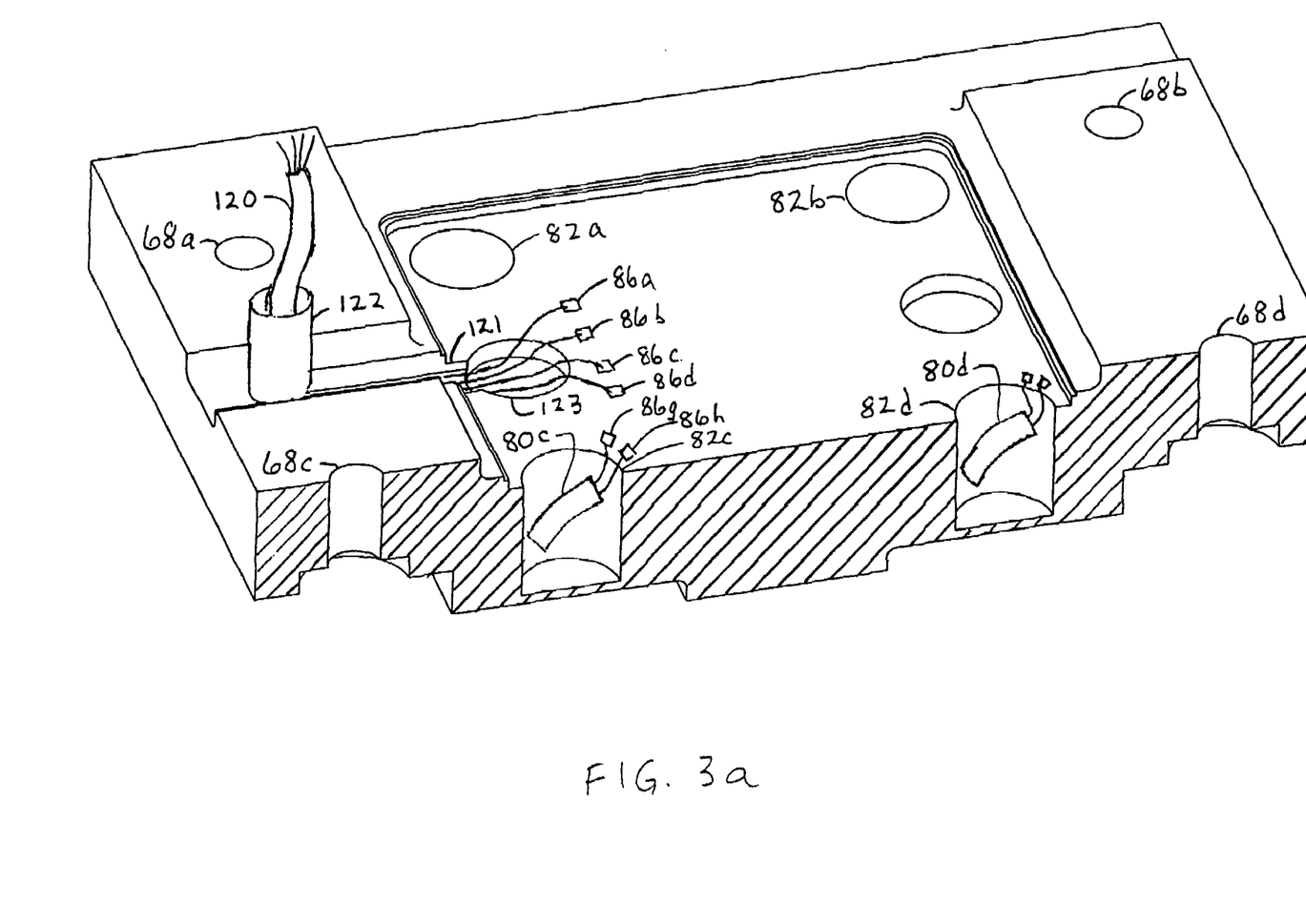
FIG. 3a is a broken away view of a load cell of the instant invention showing depth of shear strain measurement cavities and representative placement of strain gages within such cavities.
Figure 4:
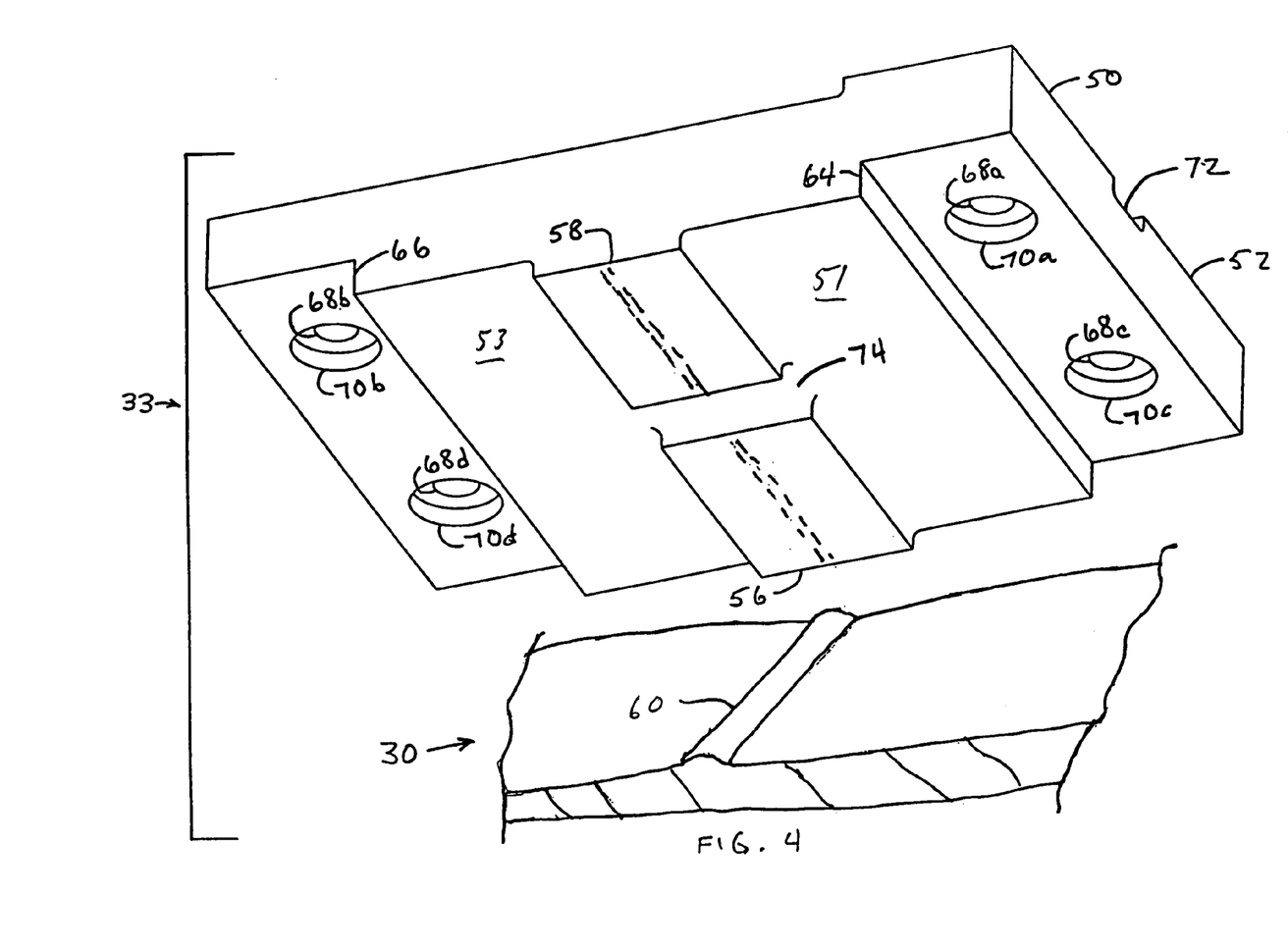
FIG. 4 is an illustration showing a view of features on a bottom side of a load cell of the instant invention and also includes an illustration of a portion of a load concentration plate.

Strain response of load cell 32 to weight-related forces applied as described above is measured by strain gages 80a through 80d FIGS. 3, 3a and also referred to collectively herein as 80) placed as illustrated in shear strain measurement cavities 82a through 82d (also referred to collectively herein as 82) designed and formed into load cell 32 in positions that experience significant deformation in response to applied loads, as illustrated in FIGS. 3 and 3a. Strain gages and associated wiring used in applications contemplated for the instant invention must be capable of withstanding and performing their intended functions in temperatures of up to 550 degrees Fahrenheit. Selection, installation, integration, compensation, and calibration of strain gages to function and provide accurate measurements in such temperatures are additional novel innovations in development and manufacture of load cells 32 for such applications. Strain gages used in most embodiments of the instant invention are gages which have a wire grid that increases in resistance when subjected to tension in a lengthwise direction of the grid, and decreases in resistance when subjected to compression. Wire grids are typically mounted on a thin, flexible, non-conductive substrate which will transmit strain from a material to which the substrate has been bonded into the wire grid affixed to the substrate. Strain gages are typically mounted on a material in which strain is to be measured by using an adhesive which dries or cures to provide a strong, tight bond capable of experiencing and transmitting strain without damage to the bond between the gage and material being deformed by applied loads. When used to measure shear induced strain in a material subjected to shear forces, gages are normally mounted on a surface of the material so that grid wires are at an angle of approximately 45 degrees with respect to a direction of shear strain so that grid wires are subjected to tension or compression as the gage is influenced by shear-induced deformation in the material being monitored. Some gages commercially available as shear strain gages have grid patterns that are pre-formed at a 45 degree angle with respect to a rectangular substrate pad to facilitate installation as shear strain gages, and may be suitable for some embodiments of the instant invention. However, normal linear strain gages may also be used with appropriate installation techniques. Other types of strain measurement transducers capable of withstanding and functioning in required temperature ranges may also be used. Examples of linear strain gages that may be used with embodiments of the instant invention include SR-4™ strain gages (Type FSM2-12-35-S6) available from Thermo BLH, Inc., 75 Shawmut Road, Canton, Mass., or Precision Strain Gages (Type WK-06-125AD-350) available from Vishay Micro-Measurements, Raleigh, N.C. Although gages noted above have grid wires that run parallel to long sides of individual gages, the substrate of the gages is sufficiently flexible to permit mounting at approximately 45 degree angles with respect to a cylindrical axis of strain measurement cavities 82 in a load cell 32 of the instant invention.

To insure a bond that is capable of withstanding temperatures of 550 to 600 degrees Fahrenheit, gages are mounted using a bonding agent that has been tested for strength and durability at such temperatures. Examples of strain gage bonding agents that may be used for installing strain gages 80 in load cells 32 of the instant invention, and which are intended for high temperature applications, include M-Bond 450 for Transducers, and P-Adhesive, both available from Vishay Micro-Measurements, Raleigh, N.C.

After strain gages 80 are initially installed in strain measurement cavities 82 of load cell 32 using a bonding agent such as identified above, strain gages 80 are temporarily covered with one or more thin sheets of protective and friction-reducing material, such as TEFLON™, capable of withstanding curing temperatures that may be as high as 650 degrees Fahrenheit. The strain gages 80 are then compressed against walls of cavities 82 using aluminum plugs wrapped in a layer of a high temperature silicon rubber or another elastically compressible material also capable of withstanding such curing temperatures. The total diameter of the plugs and wrapping of silicon rubber are sized slightly larger than cavities 82 so as to cause compression of the plugs and wrapping during installation into cavities 82. Plugs and wrapping then maintain a pressure to keep gages 80 pressed tightly against the walls of cavities 82 during high temperature curing of the gage bonding agent, thus helping to insure a bond capable of transmitting strain-induced deformations from cavity walls into substrates of strain gages. The thin sheets of protective material such as Teflon™ noted above protect, and reduce friction forces on, the gages as pressure is applied by insertion or removal of the resilient plug and wrapper, and during the curing process. The thin sheets of protective material also prevent bonding of the plug or wrapper material to walls of cavities 82. Load cells 32 with strain gages 80 thus mounted and protected are then cured in an oven at a range of temperatures and durations, as prescribed in a manufacturer's specification sheet for a particular bonding agent, in order to properly set and cure the bond between gages 80 and walls of cavities 82.

After gages 80 have been bonded and cured, the plugs and wrappers are removed and gages 80 are wired together using wire segments 84a through 84g, plus additional segments 85, 87, 89a, 89b of different types of wire, discussed later herein, all generally supported on terminal pads 86a through 86o (also referred to collectively herein as 86), which are also used for making solder connections between wire segments 84a through 84g, 85, 87, 89a, 89b. Wire segments and terminal pads are also capable of withstanding long-term exposure to temperatures of up to at least 550 degrees Fahrenheit. One type of wire that has been found suitable for application in high-temperature embodiments of load cells 32 of the instant invention is a nickel alloy wire such as an individual conductor wire of approximately 32 gauge as used within a high temperature electrical cable. One example of a high temperature cable that may be used to interconnect different load cells on a vehicle as well as to provide separate segments of wire used to make connections between strain gages within wiring cavity 88 is 4-conductor thermal wire part number 538-4C18TFELM-SS, available from Thermal Wire and Cable Corporation, 3527 Plover Ave, Naples, Fla. Insulation on individual segments of wire cut from the thermal wire cables cited just above is not suitable for temperatures and exposure conditions within a strain gage interconnect cavity 88, although interconnect cavity 88 is covered by a cover plate 95 installed on a recess 96 provided for installation of a cover. Consequently, one practice that may be used is to strip insulation from individual wires of a commercially available thermal wire cable and then insert each length of bare wire as needed into a high temperature fiberglass braided sleeving, such as is available from CableOrganizer.com, 5610 NW 12$^{th}$ Ave, Ft. Lauderdale, Fla., before installing wire lengths 84 into wiring cavity 88. Wire segments are supported and connected on terminal pads, such as CPF-100C bondable terminals, available from Measurements Group, Inc., Raleigh, N.C., using a high temperature silver solder, such as an HMP alloy also distributed by Measurements Group, Inc. Terminal pads 86 are bonded directly on a surface of a load cell within wiring cavity 88 using a high-temperature expoxy, such as Duralco 4700 Adhesive, Coating, and Potting Expoxy resin and hardener available from Cotronics Corporation, 3379 Shore Parkway, Brooklyn, N.Y.

When making solder connections on terminal pads 86, it is desirable to use silver solder to fully cover exposed copper on terminals pads with silver solder to prevent oxidation of exposed copper that would otherwise occur at temperatures of up to about 550 degrees Fahrenheit. As noted earlier, in order to measure shear strain imparted in load cell 32 by application of weight forces, strain gages 80 are installed in strain measurement cavities 82. Strain gages are installed so that the long dimension of their grid wires is inclined at 45 degrees with respect to a vertical axes of cylindrical cavities 82, and gages are also centered on walls of cavities 82 in positions that are at 90 degrees to a direction from a center of each cavity to a closest point on a centerline of load application pads 56, 58. As illustrated in FIG. 3, and in cutaway FIG. 3a, strain gages 80 are installed so that gages in diagonally opposite strain measurement cavities 82 will either both be in compression, or both be in tension, when central portions of load cell 32 are subjected to shear loads by application of forces acting through support pads 50, 52, 54 and load application pads 56, 58.

Figure 5:
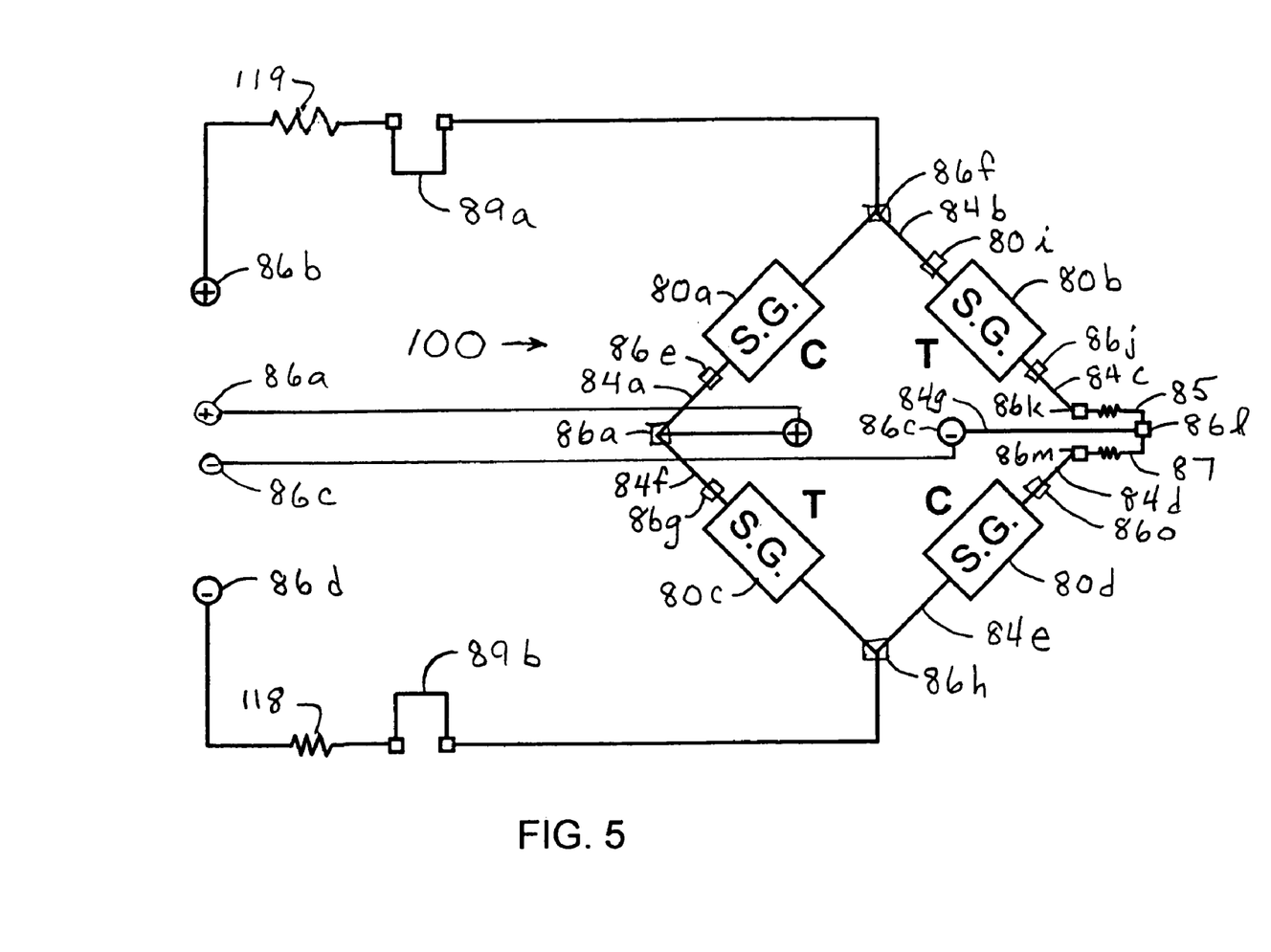
FIG. 5 is a wiring diagram showing how strain gages may be connected to form a Wheatstone bridge.

As is common in use of strain gages, gages 80 are then wired together to form a Wheatstone bridge 100, as illustrated in FIG. 5, with a strain gage forming each side of the bridge, and with each of the two parallel legs of the bridge containing a strain gage installed so as to be subjected to tensile forces (as indicated by a "T" in FIG. 5), and a strain gage installed so as to be subjected to compressive forces (as indicated by a "C" in FIG. 5). This wiring pattern provides a degree of cancellation of temperature effects on resistance of a typical strain gage and also increases sensitivity of the Wheatstone bridge to shear loads applied to load cell 32. In order to provide a reference between the schematic illustration of FIG. 5, and a physical implementation as illustrated in FIG. 3, FIG. 5 has also been annotated with reference numerals and letters that generally correspond to reference numerals and letters used to identify components in FIG. 3. In normal operation, Wheatstone bridge 100 is connected to an excitation voltage at excitation nodes 86b and 86d. Excitation voltage is typically in a range of 10 to 15 volts direct current. A readout signal is developed across nodes corresponding to terminal pads 86a and 86c as strain gages 80 respond to tension or compression shear forces as load cell 32 is placed under a weight load as described earlier herein. After initial wiring of load cell strain gages, as illustrated in FIG. 3 and FIG. 5, an excitation voltage is applied across the bridge excitation terminals via terminal pads 86b and 86d, and a voltage measurement is made across the bridge output terminals, via terminal pads 86a and 86c, at room temperature (approximately 72 degrees Fahrenheit) with no load applied to load cell 32. If the bridge is not balanced (e.g., zero output volts) under such conditions, a length of constantan wire, represented at 85, is added in a side of bridge 100 in order to add sufficient resistance to balance bridge 100 at no-load, room temperature conditions. Load cell 32 is then heated to 550 degrees Fahrenheit and bridge output is measured again under no-load conditions. A length of nickel or balco wire, represented at 87, is then added to a side of bridge 100 if needed to compensate for changes in strain gage resistance with temperature as load cell temperature is increased to 550 degrees Fahrenheit. Additional lengths of wire 89a, 89b, typically made of a special nickel alloy for modulus compensation, are added to either side of the excitation circuit path in order to compensate for changes in modulus of load cell 32 structural material as temperature of load cell material is changed. Special alloy wires for modulus compensation may be obtained from various commercial sources and applied as described in literature for different load cell materials. An example of a suitable modulus compensation wire for the example strain gage material (i.e., 17-4 stainless steel) described earlier herein is a 0.002 Nickel 270 Hard Temper wire available from MWS Industries, 31200 Cedar Valley Drive, Westlake Village, Calif., of which approximately six inches 89a, 89b, are used on each side of the excitation circuit. The needed length was calculated based upon strain gage measurements of a load cell 32 under load at temperatures of approximately 550 degrees Fahrenheit. High-temperature calibration resistors 118, 119 may also be added to each side of the excitation circuit if needed in order to obtain a desired output of approximately 2.04 to 2.08 millivolts per volt of excitation voltage at a load of 150,000 pounds. Additional terminal pads 86b' and 86d' may be added if needed to add resistors 118 and 119 in series between modulus compensation wires 89a and 89b, respectively, and terminals 86b and 86d, respectively. After compensation and calibration of an individual load cell has been completed, wires from a high temperature cable 120 such as that cited earlier herein available from Thermal Wire and Cable Corporation, are connected to appropriate terminal pads for bridge excitation (86b, 86d) and signal readout nodes (86a, 86c) using silver solder. High temperature cable 120 is routed from strain gage wiring cavity 88 via a fitting 122, which may be a short length of ½ inch NPT-threaded pipe welded to load cell 32 at a position as indicated in FIG. 3a. After completion of compensation and calibration of load cell 32, cover plate 95 is installed on ridge 96 and sealed with a high temperature sealant. One sealant that may be used to seal cover plate 95, and to also fill in and seal the point where wires from cable 120 enter wire distribution cavity 123 from channel 121 under cover 95, is Ultra Copper™ Sensor Safe High Temperature RTV Silicone Gasket Maker 101 BR, available from Permatex, Inc., Solon, Ohio.

Additional strain gages, or alternative wiring, calibration, or compensation techniques, may be used in alternative embodiments of the instant invention. However, these techniques have not been found necessary in an example application described herein involving use of load cells 32 to monitor weight changes on a typical transfer car as used in steel mill.

As noted earlier, a plurality of load cells 32 are typically installed on a transfer car 10 or other heavy vehicle for which a weight of a load is to be measured. Although it may be possible, in some applications where a balance and weight distribution of a load among multiple support points is known or predictable, to use load cells at only one or a few support points of a load and then estimate total weight based upon an expected weight distribution among instrumented (with load cells) and non-instrumented support points, confidence in estimates of total weight relies strongly upon reliability of assumptions regarding weight distribution among support points and other factors. For example, if a weight of a load is centered on a support member such that a weight distribution may be predictable to be, for example, one-half of total weight on each of two support points for the structural support member, then a total weight of a load supported by the two support points may be estimated with some confidence by using a load cell at only one support point, and then doubling the weight measured by the single load cell. However, a weight distribution of a load in many practical applications, including different orientations (e.g., uphill, downhill) possible with a vehicle, cannot generally be predicted with confidence, and friction and many other factors may be present that would reduce confidence in extrapolation a weight measurement made at only one or a few points supporting a load where other non-instrumented points are also supporting a load. Preferably, a plurality of load cells 32 are installed in locations on a vehicle and in a manner such that an entire weight of that portion of a vehicle and load for which weight is to be measured is entirely supported by the plurality of load cells.

In an application involving measurement of a weight of molten metal contained in a ladle being transported by a transfer car, such as that illustrated in FIG. 1, it is preferable that a portion of a structure of such a transfer car that will support a ladle (also referred to as "supported platform" herein) itself be entirely supported through load cells 32 installed at multiple support points. Continuing the example of use of the instant invention with a transfer car 10 such as illustrated in FIG. 1, the entire weight of a supported platform is supported on two axles 20 and four wheels 16 through eight axle block housings 6 and associated axle blocks 24, since axle block housings 6 are located on each side of each wheel 16. Load cells 32 are installed within each of the eight axle block housings 6 that are typically used in such a transfer car. Some transfer cars or other vehicles may use fewer (e.g., four) axle block housings 6 or similar support structures, and other transfer cars may use additional axle block housings 6 or similar support structures, particularly in vehicles having additional axles or wheels to distribute a load. Load cells 32 of the instant invention may generally be tailored in design to fit into locations on other vehicles similar to the locations illustrated in the example transfer car 10 illustrated in FIG. 1 so that an entire weight of a supported portion of a vehicle structure is transferred to wheels, slides, skis, tracks, or similar support elements through a plurality of such load cells. Although load cells 32 of the instant invention have been illustrated and described as being used in an orientation such that support pads 50, 52, 54 are on a top side and in contact with a top plate 26 of an axle block housing 6, and load application pads 56, 58 are on a bottom side and in contact with a ridge 60 on a load concentration plate 30, for some applications it may be desirable or acceptable to invert the respective positions and orientations of load cell 32 and load concentration plate 30 so that load concentration plate 30 is above load cell 32 and ridge 60 is applying weight force in a downward direction onto upwardly facing load application pads 56, 58 of load cell 32. However, for such an installation, if cushions or springs were located below load cell 32, it would likely be necessary to provide an additional plate between load cell 32 and cushions or springs, with such additional plate having sufficient strength and stiffness to provide a stable mount for support pads 50, 52, 54 of load cell 32 in order to prevent unexpected distortions of load cell 32 by underlying cushions or springs and thus permit an expected and reliable and generally linear shear strain response and electrical readout of load cell 32 to applied loads.

Figure 6:
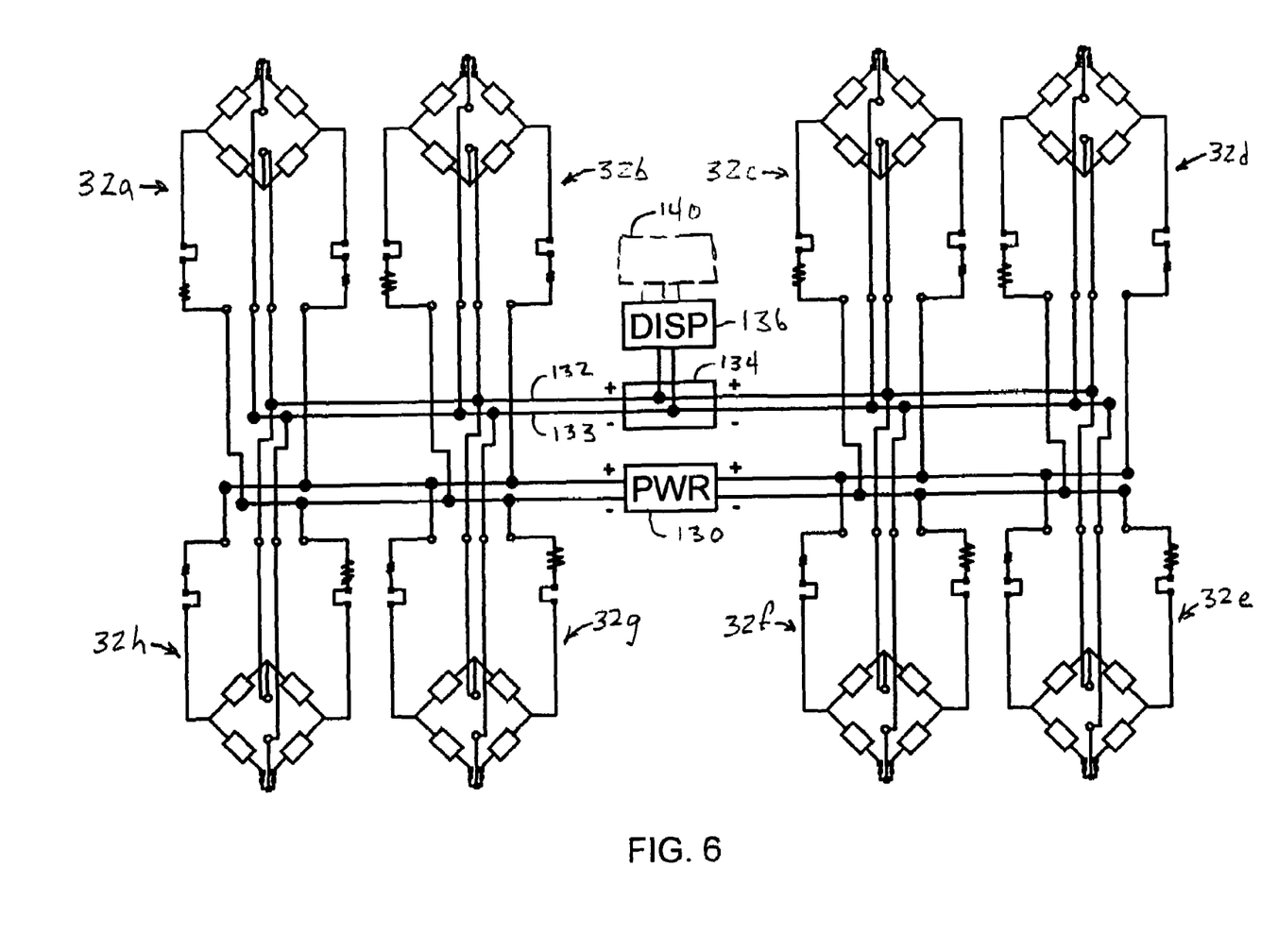
FIG. 6 is a wiring diagram showing how multiple load cells may be connected together in a weight measurement system to measure total weight changes in a transfer car.

Referring now to FIG. 6, in order to obtain a total weight of a portion of a vehicle structure supported entirely on a plurality of load cells, load cell bridge circuits 32a through 32h are provided with an excitation voltage from a power supply 130 capable of providing a DC voltage typically between 10 and 15 volts. Wires 132, 133 carrying output signals from the plurality of load cells of similar design and application on a vehicle are typically joined together in parallel in a junction box 134, referred to also as a summing box, so that a net output is obtained which represents an average among all thus connected load cells, but which net output may then be correlated to a total weight of a supported platform on a vehicle. The net output from the parallel combination of outputs from multiple load cells is then provided to signal conditioning and display equipment, such as a GSE Model 350, available from GSE Corporation, 42860 9 Mile Road, Novi, Mich. Vehicle-level calibration of a weight measurement system of the instant invention may then be obtained by monitoring a thus summed output of the plurality of load cells with no load, and again after loads of known weight are added. For example, measurements made with no ladle, an empty ladle of known weight, and a full ladle of known weight, may be used to calibrate a generally linear response of an integrated weight measurement system on a transfer car based upon use of load cells 32 of the instant invention. In alternative embodiments, multiple load cells may be connected together in groups that would allow distribution of different weights on different load cells or load cell groups to be measured. Separate weight measurements thus obtained could then be summed manually or via use of digital devices that use analog to digital (A/D) converters to sample outputs of different load cells 32, or different groupings of load cells, which measurement outputs could then be displayed individually or summed algebraically to obtain desired separate or total weight measurements. Digital sampling devices, including a device for sampling summed analog outputs, may include, or be combined with, optional wireless transmitters 140 or transceivers that transmit weight measurements (e.g., as telemetry) to locations external to a transfer car (e.g., a centralized steel mill control system) and which may also respond to commands or interrogations from a central control or other source external to a transfer car or other vehicle being monitored.

Having disclosed my invention and the manner of its use, it should be apparent to those skilled in the relevant arts that incidental changes may be made thereto that fairly fall within the scope of the following appended claims, wherein I claim:

1. A load cell configured as a load bearing component of a vehicle suspension structure wherein shear strain is created in prescribed areas of said load cell responsive to weight of said vehicle, said load cell comprising:

a generally flat plate,
a plurality of support pads on one side of said plate, said support pads located on opposed ends of said one side and defining a recess between said support pads, said support pads in load bearing relation with said vehicle suspension structure,
a relatively narrow load application pad on an opposite side of said plate, said load application pad centrally located with respect to said recess, and bisected to form two load application pads for facilitating a linear response from said load cell when said load cell is mounted on uneven said vehicle suspension structure surfaces,
a plurality of strain measurement cavities located in regions of said recess between said support pads and said load application pad, and
at least one strain gage fixed to an interior wall of each strain measurement cavity of said strain measurement cavities to produce an electrical signal indicative of weight applied to said vehicle suspension structure.

2. A load bearing vehicle with wheels that ride on a track, with a suspension system associated with each said wheel for supporting weight of said vehicle, said suspension system comprising:
a first generally flat, load bearing surface and a second generally flat, load bearing surface, said first generally flat, load bearing surface and said second generally flat, load bearing surface being in vertically aligned relation,
a load bearing, shock absorbing member between said first generally flat load bearing surface and said second generally flat load bearing surface,
a generally flat load cell assembly between one of said first generally flat, load bearing surface and said second generally flat, load bearing surface, said load cell assembly comprising:
a plurality of load application pads on one side of said load cell assembly and positioned on both ends of said load cell assembly so as to define a shallow recess therebetween, said load application pads in load bearing relation with one of said first generally flat, load bearing surface and said second generally flat, load bearing surface,
a load concentration pad underneath and centrally positioned with respect to said recess, said load concentration pad and said plurality of load application pads defining stress regions between said load concentration pad and said load application pads,
a load concentration plate having a ridge on one side thereof, said ridge extending a length of said load concentration pad and in linear, load bearing relation therewith, with the other side of said load concentration plate being in load bearing relation with said shock absorbing member,
a plurality of stress measuring cavities in said stress regions, each stress measuring cavity of said stress measuring cavities having at least one strain gage mounted therein to detect stress associated with weight applied to a respective said wheel,
circuit means connecting each strain gage together in operable relation for detecting weight of said vehicle and to a display for displaying a detected said weight of said vehicle.

3. A load bearing vehicle as set forth in claim 2 wherein said plurality of load application pads are arranged in a three point, triangular load bearing configuration on one side of said load cell assembly and said load concentration pad is in a two point, linear load bearing configuration.

4. A load cell configured as a load bearing component of a vehicle suspension structure wherein shear strain is created in prescribed areas of said load cell responsive to weight of said vehicle, said load cell comprising:
a generally flat plate,
a plurality of support pads on one side of said plate, said support pads located on opposed ends of said one side and defining a recess between said support pads, said support pads in load bearing relation with said vehicle suspension structure,
a relatively narrow load application pad on an opposite side of said plate, said load application pad centrally located with respect to said recess,
a plurality of strain measurement cavities located in regions of said recess between said support pads and said load application pad,
at least one strain gage fixed to an interior wall of each strain measurement cavity of said strain measurement cavities to produce an electrical signal indicative of weight applied to said vehicle suspension structure, and
a load concentration plate in load bearing relation with said vehicle suspension structure on one side, and a ridge approximately a length of said load application pad and in load bearing relation with said load application pad on an opposite side.

5. A load cell as set forth in claim 4 wherein said vehicle is provided with a plurality of wheels each having respective said suspension structure and an associated said load cell.

6. A load cell as set forth in claim 5 further comprising second circuit means connecting each said load cell associated with each said wheel together in electrically operative relation.

7. A load cell as set forth in claim 6 further comprising a display coupled to said second circuit means for displaying weight of said vehicle.

8. A system for measuring weight of a vehicle having a plurality of wheels each supported by a discrete suspension system, said vehicle used to transport a molten metal ladle, and for each wheel of said wheels, said system comprising;
an axle support having a first generally flat surface,
an enclosure having a second generally flat surface for containing said axle support, said axle support and said enclosure vertically movable with respect to each other to accommodate weight applied to said vehicle,
a load cell assembly positioned in load bearing relation between said first generally flat surface and said second generally flat surface and comprising;
a generally flat plate configured on one side with load bearing support pads positioned on opposed ends of said generally flat plate, said support pads in load bearing relation with one of said first generally flat surface and said second generally flat surface, said support pads defining a generally recessed region in a middle of said plate,
a load application pad on an opposite side of said plate, said load application pad in load bearing relation with the other of said first generally flat surface and said second generally flat surface, said load application pad positioned between said support pads, with regions of said recess between said support pads and said load application pad being shear regions, said shear regions having a plurality of strain measuring cavities,
a load concentration plate further comprising an extended ridge of rounded cross section on one side of said plate, said ridge in linear, load-bearing contact with said load application pad, with the other side of said load concentration plate being in load bearing relation with said other of said first generally flat surface and said second generally flat surface, a plurality of strain gages, one of each mounted in one of each said strain measuring cavities, first circuit means for electrically connecting said plurality of strain gages in one said load cell assembly associated with one said wheel together in operative relation, second circuit means for electrically connecting load cells associated with said plurality of wheels in operative relation to obtain an electrical signal indicative of weight of said vehicle, said first circuit means and said second circuit means operable at temperatures up to about 550 degrees Fahrenheit.

9. A system as set forth in claim 8 further comprising a generally flat suspension component between said other side of said load concentration plate and said other of said flat surfaces.

10. A system as set forth in claim 9 wherein two of said support pads are positioned toward one end of said plate, and a third support pad of said support pads is on an opposite end of said plate.

11. A system as set forth in claim 10 wherein said two support pads are aligned across a width of said plate and said third support pad extends a width of said plate, said two support pads and said third support pad defining a triangular three-point load bearing configuration.

12. A system as set forth in claim 11 wherein said load application pad and said ridge extends generally a width of said flat plate, with said load application pad being bisected to define a two-point, linear load-bearing configuration.

* * * * *